United States Patent
Palasz

(10) Patent No.: US 10,711,166 B2
(45) Date of Patent: Jul. 14, 2020

(54) UV CURABLE ADHESIVES BASED ON ACRYLIC POLYMERS

(71) Applicant: HENKEL AG & CO. KGAA, Duesseldorf (DE)

(72) Inventor: Peter D. Palasz, Maidenhead (GB)

(73) Assignee: HENKEL AG & CO. KGAA, Duesseldorf (DE)

( * ) Notice: Subject to any disclaimer, the term of this patent is extended or adjusted under 35 U.S.C. 154(b) by 0 days.

(21) Appl. No.: 15/802,853

(22) Filed: Nov. 3, 2017

(65) Prior Publication Data

US 2018/0051194 A1 Feb. 22, 2018

Related U.S. Application Data

(63) Continuation of application No. PCT/EP2016/060140, filed on May 6, 2016.

(30) Foreign Application Priority Data

May 7, 2015 (EP) .................................... 15166777

(51) Int. Cl.
| | |
|---|---|
| *C09J 133/08* | (2006.01) |
| *C09J 4/06* | (2006.01) |
| *C09J 133/06* | (2006.01) |
| *C08F 222/10* | (2006.01) |
| *C08F 2/48* | (2006.01) |
| *C08F 220/18* | (2006.01) |
| *C09J 5/06* | (2006.01) |
| *C09J 11/06* | (2006.01) |

(52) U.S. Cl.
CPC ............... *C09J 133/08* (2013.01); *C08F 2/48* (2013.01); *C08F 220/18* (2013.01); *C08F 222/1006* (2013.01); *C09J 4/06* (2013.01); *C09J 5/06* (2013.01); *C09J 11/06* (2013.01); *C09J 133/06* (2013.01); *C09J 2201/606* (2013.01); *C09J 2201/61* (2013.01); *C09J 2203/30* (2013.01); *C09J 2205/31* (2013.01)

(58) Field of Classification Search
CPC ............ C08F 299/028; C08F 222/1006; C09J 133/06; C09J 155/005
See application file for complete search history.

(56) References Cited

U.S. PATENT DOCUMENTS

| | | | |
|---|---|---|---|
| 7,745,505 B2 | 6/2010 | Liu et al. | |
| 2002/0032249 A1* | 3/2002 | Eckberg | C08K 5/0025 522/25 |
| 2003/0100624 A1 | 5/2003 | Shi et al. | |
| 2004/0244641 A1* | 12/2004 | Takabayashi | C07C 381/12 106/31.27 |
| 2006/0110596 A1 | 5/2006 | Palasz et al. | |
| 2013/0197156 A1 | 8/2013 | Palasz et al. | |
| 2014/0066539 A1* | 3/2014 | Tobing | C09J 153/00 522/46 |
| 2014/0302289 A1* | 10/2014 | Duzy | B41M 7/0081 428/201 |
| 2014/0303274 A1 | 10/2014 | Liu et al. | |

FOREIGN PATENT DOCUMENTS

| | | |
|---|---|---|
| EP | 1854442 A2 | 11/2007 |
| JP | 2001131518 A | 5/2001 |
| JP | 2009536977 A | 10/2009 |
| JP | 2010509439 A | 3/2010 |
| JP | 2013522394 A | 6/2013 |
| JP | 2014221873 A | 11/2014 |
| JP | 2015017146 A | 1/2015 |
| WO | 9413749 A1 | 6/1994 |
| WO | WO-2013025443 A2 * | 2/2013 ............... B32B 7/12 |

OTHER PUBLICATIONS

Satas, D. "Handbook of Pressure Sensitive Adhesive Technology" Van Nostrand Reinhold, 1989.
Wang, Jie et al "Progress in Photosensitizer for Cationic Polymeration" Information recording materials, vol. 13, No. 6, 2012, pp. 41-45. English abstract on p. 45.

* cited by examiner

*Primary Examiner* — Mark S Kaucher
(74) *Attorney, Agent, or Firm* — Sun Hee Lehmann

(57) ABSTRACT

The present invention relates to a UV curable adhesive composition comprising a UV curable acrylic polymer comprising at least one covalently bound UV-reactive group and a cationic photoinitiator and a method of curing such composition. The invention further includes hot melt pressure sensitive adhesives comprising such cured composition and use of said hot melt pressure sensitive adhesives.

10 Claims, No Drawings

UV CURABLE ADHESIVES BASED ON ACRYLIC POLYMERS

FIELD OF THE INVENTION

The present invention relates to a UV curable adhesive composition comprising a UV curable acrylic polymer which comprises at least one covalently bound UV reactive group and a cationic photoinitiator. The invention further includes a method of curing such composition and hot melt pressure sensitive adhesives comprising such cured composition.

BACKGROUND OF THE INVENTION

Pressure sensitive adhesives (PSAs) are permanently tacky at room temperature and adhere to surfaces by application of light finger pressure. PSA compositions are commonly applied to various substrates, such as paper, fabric, metal, and plastic films that are then converted into a large number of different products, especially pressure sensitive adhesive tapes, medical tapes and labels. These pressure sensitive adhesive products have a broad field of application in the automobile industry, e.g., for fastening or sealing, in the pharmaceutical industry, e.g., for bandages or transdermal drug delivery systems, or in the packaging industry, e.g., for sealing, bonding or labeling.

PSAs can be formulated for application as a solvent borne or a molten adhesive. Hot melt pressure sensitive adhesives (HMPSAs) are compositions that combine the properties of hot melt adhesives with those of pressure sensitive adhesives. Hot melt adhesives are solids at room temperature, melt at elevated temperatures to coat on a substrate, and regain their solid form on cooling. The combination of these properties provides compositions that melt at elevated temperatures and cool to form a permanently tacky solid coating that adheres on contact. A good workable HMPSA must exhibit high cohesive strength at room temperature, low shrinkage on substrates, retention of pressure sensitive properties during storage and use, and a relatively fluid viscosity at typical coating temperatures (e.g., between 80° C. and 180° C.). Although very low molecular weight polymers will yield hot melt adhesives with sufficient fluidity, the resulting adhesives lack cohesive strength. Very high molecular weight polymers give better cohesive strength, but are too viscous at the common application temperatures to be easily coatable on substrates. They must be blended with a high proportion of low molecular weight oils or resins to reduce the viscosity. The addition of low molecular weight oils or resins in turn detracts from the cohesive strength and heat resistance. To avoid these problems, polymers of moderate molecular weight have been made with various functional groups which undergo crosslinking reactions (curing) by heat or actinic radiation. In this manner, the cohesion of acrylic PSAs can be raised by means of sufficient curing.

Acrylic polymers are widely used in the field of PSA, because they offer great synthetic versatility in that a wide range of monomers are commercially available and the polymer architecture can already be controlled during polymerisation.

However, the technologies for crosslinking acrylic polymers known in prior art have some drawbacks.

Some technologies in prior art require the addition of multifunctional polyol and other hydroxyl-functional groups for crosslinking the polymers.

Some technologies in prior art are directed to the use of photopolymerizable diacrylate. Due to the difunctional acrylate which crosslinks upon radical polymerization, it is less desirable for use in an adhesive, and especially unsuitable for a hot melt adhesive, because it is necessary to polymerize the acrylate monomers following application onto the final coated substrate.

With increasing pressures on reducing environmental emissions from factories and energy costs, there is an ongoing demand and a continuing need in the art for UV-curable acrylic polymers that are hot melt processable. The current invention addresses this need by providing hot melt compositions comprising UV curable acrylic polymers and cationic photoinitiators and, following the coating operation, are cured under UV irradiation on the substrates. The cured product is a hot melt acrylic PSA.

SUMMARY OF THE INVENTION

In one aspect, the present invention relates to a UV curable adhesive composition comprising:
  a) a UV curable acrylic polymer polymer comprising at least one covalently bound UV-reactive group; and
  b) a cationic photoinitiator.

In another aspect, the present invention relates to a method of curing the adhesive composition according to the invention, comprising the steps of
  coating onto a substrate said composition; and
  exposing the coated composition to UV radiation at a wavelength in the range of 200 to 600 nm, more preferably 360 to 410 nm.

In yet another aspect, the present invention is directed to a hot melt pressure sensitive adhesive comprising the cured product of the adhesive composition.

In a further aspect, the present invention encompasses use of the hot melt pressure sensitive adhesive in tapes, medical tapes or transfer films.

DETAILED DESCRIPTION OF THE INVENTION

In the following the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise:

As used herein, the singular forms "a", "an" and "the" should be interpreted as "at least one" unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical end points includes all numbers and fractions subsumed within the respective ranges, as well as the recited end points.

Unless otherwise defined, all terms used in the disclosing the invention, including technical and scientific terms, have the meaning as commonly understood by one of ordinary skill in the art.

In one aspect, the present invention provides a UV curable adhesive composition comprising:
  a) a UV curable acrylic polymer comprising at least one covalently bound UV-reactive group; and b) a cationic photoinitiator.

The first essential component of the UV curable adhesive composition according to present invention is a UV curable acrylic polymer comprising at least one covalently bound UV-reactive group.

The choice and relative amount of suitable acrylic monomers which build up the UV curable acrylic polymer depend upon the desired final properties and contemplated end uses of the adhesives. The choices of which acrylic monomers and their relative amounts in the final composition to achieve the desired properties are within the expertise of those skilled in the art.

Examples of acrylic monomers suitable according to the present invention are acrylic monomers which are an acrylic or methacrylic acid derivative of the formula $CH2=CH(R1)(COOR2)$, wherein R1 is H or CH3 and R2 is an branched or unbranched C1 to 20 alkyl chain, more preferably the monomer is selected from methyl acrylate, ethyl acrylate, ethyl methacrylate, methyl methacrylate, n-butyl acrylate, n-butyl methacrylate, n-pentyl acrylate, n-hexyl acrylate, n-heptyl acrylate, and n-octyl acrylate, n-nonyl acrylate, lauryl methacrylate, cyclohexyl acrylate, and branched (meth)acrylic isomers, such as i-butyl acrylate, i-butyl methacrylate, n-butyl methacrylate, 2-ethyihexyl acrylate, stearyl methacrylate, and isooctyl acrylate or combinations thereof. The exemplary acrylates and/or methacrylates are monoacrylic monomers. Any di- or multi-acrylate monomers are preferably not included.

The UV curable acrylic polymer according to present invention contains a bound UV-reactive group, in order to promote crosslinking of the polymer chains. Examples of such bound functional group in the present invention include functionality like bound radical photoinitiator, benzophenone or vinyl groups. More preferably the bound UV-reactive group is a benzophenone.

It is preferably that the UV curable acrylic polymer according to present invention is essentially free of any monomer comprising a bound reactive functional group selected from cycloaliphatic epoxide, oxetane or mixtures thereof. The term "is essentially free of" as used herein means that the amount of the monomer comprising a bound reactive functional group selected from cycloaliphatic epoxide, oxetane or mixtures thereof is less than 0.25 wt.-%, preferably 0.1 wt. %, more preferably 0.01 wt.-%, even more preferably 0.001 wt.-%, most preferably 0 wt.-%, based on the total weight of the UV curable acrylic polymer.

It is preferably that the UV curable acrylic polymer according to present invention has a Tg value less than 0° C., more preferably from −40 to −20° C., and has a weight average molecular weight (Mw) from 10,000 to 2,000,000 g/mol, more preferably from 50.000 to 1,000,000 g/mol and most preferably from 150,000 to 300,000 g/mol. The Mw is determined by gel permeation chromatography (GPC); polystyrene is used as standard.

As known by those skilled in the art, the preparation of acrylic polymers can be carried out by solution, emulsion, or bulk polymerization procedures using well-known polymerization techniques, such as free radical techniques. The copolymers can then be formed into hot melt adhesives by removal of the solvent, coagulation of the latex, or melt-processing of the neat polymers.

The polymerization may be conducted in the presence of one or more organic solvents and/or in the presence of water. Suitable organic solvents or mixtures of solvents are alkanes, such as hexane, heptane, octane, isooctane, and cyclohexane; aromatic hydrocarbons, such as benzene, toluene, and xylene; esters, such as ethyl, propyl, butyl and heptyl acetate; halogenated hydrocarbons, such as chlorobenzene; alkanols, such as methanol, ethanol, iso-propanol, ethylene glycol, and ethylene glycol monomethyl ether; ethers, such as diethyl ether and dibutyl ether; and mixtures thereof.

In one advantageous embodiment of the invention, the polymerization reactions proceed in an ethyl acetate solvent, thermally initiated by, for example, azobisisobutyronitrile (AIBN).

The UV curable acrylic polymer according to present invention is preferably substantially linear in its structure before UV crosslinking reaction. Therefore, the acrylic polymer, before crosslinking, is completely soluble in many organic solvents, and can also be easily applied on substrates in solvent-free form as a hot melt adhesive.

To be used as hot melt PSAs, the acrylic polymers must be essentially free of the solvent. For this purpose the copolymers prepared as described above are concentrated to a solvent content of less than 2% by weight, preferably less than 0.5% by weight. This process takes preferably place in a reaction tank, or vacuum mixer, concentration extruder, such as vent extruder, ring extruder, single-screw extruder, or twin-screw extruder, which are known to those skilled in the art.

A particularly preferred UV acrylic polymer comprises 2-ethylhexyl acrylate that has bonded to it a pendant benzophenone group. Such UV acrylic copolymers are commercially available from BASF under the trade names acResin® A 203 UV and acResin® A 204 UV, acResin®A 260 UV, acResin®A 250 UV. BASF's acResin® A 258 UV product, which comprises, as main component, butyl acrylate, may also be used in the practice of the invention. Further suitable polymers are disclosed in U.S. Pat. No. 7,745,505 and US 2013197156.

Furthermore, the UV curable adhesive composition according to present invention comprises at least one cationic photoinitiator, preferably from 0.01 to 5 wt.-%, based on the total weight of the composition, more preferably from 0.01 to 1.5 wt.-%, even more preferably from 0.01 to 1 wt.-%, most preferably from 0.4 to 0.7 wt.-%.

The primary function of a photoinitiator is to initiate crosslinking reaction when the photoinitiator is irradiated with UV radiation. Any of the many compounds known to initiate polymerization by a cationic mechanism can be used for the crosslinking reaction in the present invention. These include, for example, diaryliodonium salts, triarylsulfonium salts, dialkyiphenylsulfonium salts, dialkyl(hydroxydialkylphenyl)sulfonium salts and ferrocenium salts. The anions in theses salts generally possess low nucleophilic character and include $SbF_6^-$, $PF_6^-$, $AsF_6^-$, $BF_4^-$, $B(C_6F_6)_4^-$ or $Ga(C_6F_5)_4^-$. Particularly useful cationic initiators are soluble and red-shifted sulfonium salt photoinitiators, which have increased solubility in UV-crosslinkable compositions, promote efficient thick film UV curing, and exhibit increased thermal stability in UV crosslinkable compositions before cure, exhibit increased curing rates, and have a reduced dark cure time. Specific examples include Irgacure 250 from BASF.

In addition to above mentioned ingredients the UV curable adhesive composition according to present invention may further comprise at least one photosensitizer, preferably from 0.01 to 5 wt.-%, based on the total weight of the composition, more preferably from 0.01 to 1.5 wt.-%, most preferably from 0.2 to 0.6 wt.-%.

A photosensitizer according to present invention absorbs and transfers light energy that cannot directly excite the initiator, provides effective energy transfer to the photopolymerization initiator, leading to accelerated polymerization and improved properties of cured products, e.g. adhesiveness or surface hardness.

Examples of photosensitizer according to present invention include, but are not limiting to 2,4-diethyl-9H-thioxanthen-9-one, 2-isopropylthioxanthone, 9, 10-dibutoxyanthracene and mixtures thereof.

It may further be of advantage to add compounds to the UV curable composition that facilitate subsequent crosslinking. For this purpose the copolymers may optionally be blended with cross-linkers. Thus, it is preferable that the UV curable adhesive composition according to present invention further comprises at least one unsaturated oligomer (cross-linker), preferably from 0.01 to 20 wt.-%, based on the total weight of the composition, more preferably from 5 to 10 wt.-%.

It is preferably that the unsaturated oligomers according to present invention has a weight average molecular weight (Mw) of less than 5,000 g/mol, more preferably less than 3,000 g/mol and most preferably less than 1,000 g/mol. The Mw is determined by gel permeation chromatography (GPC). Examples of suitable unsaturated oligomers are functional acrylates. Preferred substances in accordance with the inventive process in which crosslinking occurs under radiation are, for example, difunctional or trifunctional or polyfunctional acrylates, difunctional or polyfunctional urethane acrylates. More preferably the unsaturated oligomer according to present invention is selected from dipentaerythritol pentaacrylate, di-trimethylolpropane tetraacrylate, pentaerythritol tand mixtures thereof. It is, however, also possible to use other difunctional or polyfunctional compounds which are known to the skilled person and which are capable of crosslinking acrylic polymers.

It is preferably that the UV curable adhesive composition according to present invention is a hot-melt composition.

In another aspect, the present invention relates to a method of curing said UV curable adhesive composition according to the present invention, comprising the steps of
coating onto a substrate the said composition,
exposing the coated composition to UV radiation with a wavelength in the range of 200 to 600 nm, more preferably 360 to 410 nm.

The general procedures used to apply a hot melt adhesive composition to a substrate are well known to those skilled in the art. Preferably, the adhesive composition according to present invention was coated using a chemsultant coater which consists of two heated rolls and a reservoir at various coat weights as a free film between two silicon paper liners. Prior to UV curing one liner was removed. Commonly used industrial coating temperatures are in the range of 80 to 180° C., preferably 130° C.

The coated adhesive film can be cross-linked in air by irradiation with UV light in the range from 200 to 600 nm, preferably from 360 to 410 nm, more preferably from 365 to 395 nm. Irradiation may be done immediately while the adhesive compositions are still in a melt form, or after they have been cooled to room temperature.

The adhesive film is irradiated for a period of time sufficient to transform the low cohesion composition into a viscoelastic adhesive of higher modulus. The exact length of the exposure is dependent upon the nature and intensity of the radiation, the amount of cationic photoinitiator, the polymer composition, adhesive formulation, the thickness of the adhesive film, environmental factors, and the distance between the radiation source and the adhesive film.

The UV radiation used to cure the inventive composition may be generated from a variety of UV light sources, such as UV LED, carbon arcs, mercury-vapor arcs, fluorescent lamps with special ultraviolet light emitting phosphors, electronic flash lamps and the like, lasers of specific wavelengths, or combinations of those. However, a particularly desirable source to generated UV radiation at the practicing wavelength is a LED source. Relative to the conventional UV light sources, which may contain mercury and generate ozone during operation, LED source typically does not contain mercury, does not form ozone and has a significantly longer lifetime and lower energy cost, which makes the using of LED source more cost effective and more environmentally friendly. However, the LED sources typically have a narrower emission distribution comparing to the conventional UV light sources, which makes using of LED sources unsuitable for curing of most polymer systems in prior art requiring relative low wavelength. It has been surprisingly found that UV LED can be applied for curing the adhesive system according to the present invention.

In another aspect, the present invention is directed to a hot melt pressure sensitive adhesive comprising the cured product of the adhesive composition according to the present invention, wherein said composition was coated onto a substrate and then exposed to UV radiation at a wavelength in the range of 200 to 600 nm, more preferably 360 to 410 nm.

It is preferably that the hot melt PSA has a viscosity from 10,000 to 100,000 Pas at 130° C., more preferably from 30,000 to 50,000 Pas at 130° C. Viscosity measurements were performed using a Brookfield DV-I Viscometer at the defined temperature. A sample of 10 g was used with a spindle No 27 at a speed setting of 4 rpm. The result was recorded after 20 minutes when the reading had stabilized.

The hot melt PSA may also comprise various other additives, such as plasticizers, tackifiers, fillers, inhibitors and antioxidants, all of which are conventionally used in the preparation of PSAs. The additives are mixed with the adhesive composition before curing.

It is preferably that the hot melt PSA according to present invention comprises at least one tackifier. As tackifier or tackifying resins to be added, it is possible to use any known tackifying resins which are compatible with the corresponding acrylic polymers. Non-limiting examples include pinene resins, indene resins, and their disproportionated, hydrogenated, polymerized, and esterified derivatives and salts, the aliphatic and aromatic hydrocarbon resins, terpene resins, terpene-phenolic resins, $C_5$ resins, $C_9$ resins, and other hydrocarbon resins. Any desired combinations of these or other resins may be used in order to adjust the properties of the resultant adhesive in accordance with the desired final properties.

The hot melt PSA may further be mixed with one or more fillers such as fibers, carbon black, zinc oxide, titanium dioxide, solid or hollow glass microbeads, microbeads of other materials, silica, silicates, and chalk.

Explicit reference regarding suitable additives is made to the depiction of the state of the art in the "Handbook of Pressure Sensitive Adhesive Technology" by Donatas Satas (van Nostrand, 1989).

One further development that makes the process of the invention particularly advantageous for the production of hot melt PSAs is that all additives are either blended to the molten, solvent-free acrylic polymers, or more efficiently, added into the solutions of the copolymers at the end of the polymerization reactions. Upon the removal of the solvent, the mixtures are concentrated to give hot melt PSAs. After curing the final hot melt PSA will be obtained.

It is preferably that the hot melt PSA has a volatile solvent content of less than 0.5% by weight of the total adhesive, more preferably less than 0.2%, and most preferably the hot melt PSA is absolutely solvent-free (0% by weight of the total adhesive).

The hot melt PSA according to present invention preferably has a Shear Adhesion Failure Temperature (SAFT) of greater than 110, more preferably greater than 150, most preferably greater than 200. The SAFT measurement was performed according to Procedure Finat TM05 adapted as follows. A coated sample of the hot melt PSA on PET substrate was placed on 25×25 mm mirrored stainless steel panels (supplied from Rocholl GmbH). Test specimen was placed into the test oven at room temperature. The heating program of the oven was started and 1 Kg shear load was applied when the temperature reached 40° C. The oven temperature was then increased by 0.5° C./minute and the temperature at which the bond failed (SAFT) was recorded. If the bond did not fail, the test automatically ended at 200° C. at which time the oven will begin to cool down. If the sample did not drop at a temperature of 200° C. this was considered very good. If it dropped at 110° C., this was considered good. If the sample dropped at 40° C., this had failed the test.

The hot melt PSA according to present invention preferably has a shear adhesion of greater than 50 hours, more preferably greater than 100 hours. Shear adhesion was measured according to Procedure Finat TM04, adapted as follows. A coated sample of the hot melt PSA on PET substrate was placed on 25×25 mm on to gritted steel panels (supplied from Rocholl GmbH). with applied pressure the panels were allowed to stand for 15 minutes to ensure they adhesive had wetted out. Then the shear adhesion was measured by applying a load of 1 kg, The panels were then ready for testing at a temperature of 70° C. The time in hours was recorded until the adhesive bond failed. After 168 hours the testing was stopped. A result of 168 hours was considered to be very good, around 100 hours good and around 50 hours acceptable.

It is preferably that the hot melt PSA according to the present invention has a high peel adhesion. According to Procedure Finat TM02, peel adhesion was measured as the force required to remove a pressure sensitive tape from a standard stainless steel panel at a specified angle and speed.

In a further aspect, the present invention encompasses use of the hot melt pressure sensitive adhesive in tapes, medical tapes or transfer films.

Application of the hot melt PSAs may be accomplished using any conventional means, such as roller, slot orifice, spray, or extrusion coating. Non-limiting examples of substrate are films, tapes, sheets, panels, foam, and the like; and can be made of materials such as paper, fabric, plastic (polyesters, PE, PP, BOPP, and PVC), nonwoven fiber, metal, foil, glass, natural rubber, synthetic rubber, wood, or plywood. If a coated substrate is to be used in the form of a self-wound roll, the back of the substrate is usually coated with a release coating to prevent the adhesive from adhering to the reverse side of the substrate. If a substrate is to be coated with the adhesive on both sides and rolled, a strippable paper or other protective means is laid over the adhesive on one side to prevent that adhesive from adhering to the adhesives on the other. In some uses, a second substrate may be applied directly to the adhesive.

The holt melt PSAs according to present invention may advantageously be used in the manufacture of adhesive articles including, but not limited to, industrial tapes and transfer films. Single and double face tapes, as well as supported and unsupported free films are encompassed by the invention. In one embodiment, the adhesive article comprises an adhesive coated on at least one major surface of a backing having a first and second major surface. Useful backing substrates include, but are not limited to, foam, metal, paper, fabric, and various polymers such as polypropylene, polyamide, polyester, polyethylene terephthalate, and mixtures thereof. The adhesive may be present on one or both surfaces of the backing. When the adhesive is coated on both surfaces of the backing, the adhesive coatings can be the same or different.

EXAMPLES

Comparative Examples C1 to C5 and Examples I5a to 5f

The exemplarily HMPSA compositions were prepared as follows at approximately 100 g scale. The acrylic polymer was heated to 130° C. until molten in an oven. After fully mixing, the photo initiator was mixed with the acrylic polymer. It was then followed by adding the sensitizer. After fully mixing the above, the unsaturated oligomers were added and mixed. If the sample had too much air incorporated due to the mixing process it was placed in a vacuum desiccator to remove the entrapped air. The sample was then coated as a 50 gsm (grams per square meter) film onto a silicone paper, the film was then laminated to a polyethylene terephthalate (PET) backing paper (Mylar®, DuPont). Unless otherwise defined, the samples were cured using a Phoseon UV-LED. Firefly air cooled with 8 W output power with a wave length of 395 nm and the UVA dose is 1 J/cm$^2$ as measured by a power Puk device. Samples were placed at 3 cm distance from the emitting window of the LED source and cured for 3 seconds.

SAFT and SHEAR were measured as described above.

Peel Adhesion

The Peel Adhesion in the examples was expressed in Newton per 25 mm width of tape. Equipment used included a standard FINAT 2 Kg rubber-covered roller, and a standard Instron Tensile Testing Machine. The following procedure was used: a stainless steel panel (supplied from Rocholl GmbH) was cleaned as per standard FINAT method. Before the stainless steel panel is used it is abraded along the length of the test panel with a 400-grit waterproof wet and dry sanding paper under the tap, until water flows smoothly over the steel plate. After this it is rinsed with water and dried, cleaned with ethyl acetate, and conditioned in the climate room for at least 1 hour.

The coating to be tested was conditioned for 24 hours at 23° C.±2° C. and 50%±5% relative humidity (RH). Test strips having the dimension 25 mm×175 mm were cut.

The backing paper was removed from each strip and placed, adhesive side down, onto a clean test plate using light finger pressure, and then rolled twice in each direction with the standard 2 Kg FINAT test roller, at a speed of approximately 10 mm per second. After applying the strips to the test plate at a rate of one per 2 minutes the strips were left until the 1st test piece has had a 20-minute or 24 hours dwell.

The Instron was set with a crosshead speed of 300 mm per minute. The free end of the tape was doubled back at an angle of 180°, clamped to the upper jaw of the Instron. The end of the panel was clamped to the lower jaw of the Instron. The test strip was then peeled from the panel and the peel force recorded in Newtons per 25 mm width of tape. The peel strength was measured after wetting out a stainless steel panel for 24 hours.

The results obtained for adhesive mode failure were classified as:
AF. Adhesion Failure or Clean Peel: test piece separates from test plate without leaving any residue.
CF. Cohesive Failure: adhesive film splits cohesively and leaves residue on test piece and test plate.
AT. Adhesive transfer: adhesive film remains on the test plate and is cleanly removed from the PET film.

The properties of the cured HMPSA compositions are displayed in the following Table all amounts in wt.-% unless stated otherwise:

| HM-PSA | A-204 | A-260 | SR-355 | SR-399 | Irgacure 819 | Irgacure 250 | IHT 436 | Uvicure 2257 | SC-ITX | SC-DETX | SAFT [° C.] | SHEAR [Hour] | 24 h Peel adhesion [N/25 mm] |
|---|---|---|---|---|---|---|---|---|---|---|---|---|---|
| C-1 | 100 | | | | | | | | | | 40 | 0.02 CF | 23 CF |
| C-2a | 95 | | 5 | | | | | | | | 40 | 0.02 CF | 20 CF |
| C-2b | 95 | | | 5 | | | | | | | 40 | — | 19 CF |
| C-2c | | 94.5 | 5 | | 0.5 | | | | | | 43 CF | 0.1 | 28 CF |
| C-3 | 93 | | 5 | | 2 | | | | | | 110 | 2 | 18 AF |
| C-4 | 92.5 | | 5 | | 2 | | | | 0.5 | | 105 | 6 | 16 AF |
| I-5a | 93.75 | | 5 | | | 0.75 | | | 0.5 | | 200 | 168 | 15 AF |
| I-5b | 93.75 | | | 5 | | | | 0.75 | 0.5 | | 193 | 168 | 14 AF |
| I-5c | 93.75 | | 5 | | | | 0.75 | | | 0.5 | 200 | 168 | 14 AF |
| I-5d | 93.75 | | 5 | | 0.75 | | | | | 0.5 | 200 | 168 | 13 AF |
| I-5e | | 93.75 | 5 | | 0.75 | | | | 0.5 | | 200 | 168 | 18 AF |
| I-5f | | 93.75 | | 5 | 0.75 | | | | 0.5 | | 200 | 168 | 15 AF |
| C-5 | 99.5 | | | | | | | | | 0.5 | 65 CF | 0.5 | 27 CF |

Ingredients:
A-204, acResin A204, acrylic polymer with bound PI groups, supplied by BASF.
A-260, acResin A260, acrylic polymer with bound PI groups, supplied by BASF
SR-355: unsaturated oligomers, supplied by Sartomer.
SR-399: unsaturated oligomers, supplied by Sartomer.
Irgacure 819: conventional free radical photo initiator, supplied by BASF.
Irgacure 250: diaryliodonium salts, conventional cationic photo initiator, supplied by BASF.
IHT 436: triarylsulfonium salts, conventional cationic photo initiator, supplied by IHT.
Uvicure 2257: conventional cationic photo initiator, supplied by Ney York Fine chemicals
SC-ITX: Speedcure ITX, sensitizer, supplied by Lamsbon.
SC-DETX: Speedcure DETX, sensitizer, supplied by Lamsbon.

The comparative example C-1 shows that the crosslinking of the acrylic polymer with bound PI groups failed to provide advantageous properties to the PSA composition.

Addition of unsaturated oligomers to the acrylic polymer with bound PI groups did not really improve the crosslinking, as shown by comparative example C-2.

By adding a conventional free radical photo initiator to the HMPSA C-2, the crosslinking has been improved, but not significantly, as shown by comparative example C-3.

The comparative example C-4 shows that adding a sensitizer to the conventional free radical photo initiator did not improve the crosslinking.

The best adhesive performance regarding SAFT and SHEAR has been achieved by the examples I5, which used a conventional cationic photo initiator instead of the conventional free radical photo initiator, together with the added sensitizer.

The invention claimed is:

1. A UV curable adhesive composition comprising:
   a) a UV curable acrylic polymer comprising at least one covalently bound UV-reactive group, wherein the at least one covalently bound UV-reactive group is benzophenone;
   b) a cationic photoinitiator;
   c) a photosensitizer; and
   d) an unsaturated oligomer;

wherein the UV curable acrylic polymer is built from mono-acrylic monomers having a formula of $CH_2{=}CH(R1)(COOR2)$, wherein R1 is H or $CH_3$ and R2 is a branched or unbranched C1 to C20 alkyl chain.

2. The composition according to claim 1, wherein the UV curable acrylic polymer is essentially free of a covalently bound reactive functional group selected from cycloaliphatic epoxide and oxetane.

3. The composition according to claim 1, wherein the composition comprises the cationic photoinitiator from 0.01 to 5 percent by weight based on the total weight of the composition.

4. The composition according to claim 1, wherein the cationic photoinitiator is selected from the group consisting of diaryliodonium salts, triarylsulfonium salts, dialkylphenylsulfonium salts, dialkyl(hydroxydialkylphenyl)sulfonium salts and ferrocenium salts.

5. The composition according to claim 1, wherein the photosensitizer is selected from the group consisting of 2,4-diethyl-9H-thioxanthen-9-one, 2-isopropylthioxanthone, 9,10-dibutoxyanthracene and mixtures thereof, and is present in an amount of 0.01 to 5 percent by weight based on the total weight of the composition.

6. The composition according to claim 1, wherein the unsaturated oligomer is selected from the group consisting of dipentaerythritol pentaacrylate, di-trimethylolpropane tetraacrylate, pentaerythritol tetraacrylate and mixtures thereof, and is present in an amount of 0.01 to 20 percent by weight based on the total weight of the composition.

7. The composition according to claim 1, which is a hot-melt composition.

8. A method of curing the composition according to claim 1, comprising the steps of
   (1) coating onto a substrate said composition; and
   (2) exposing the coated composition to radiation with a wavelength in the range of 360 to 410 nm.

9. A hot melt pressure sensitive adhesive comprising the cured product of the composition according to claim 1, wherein said composition is coated onto a substrate and then exposed to radiation at a wavelength in the range of 360 to 410 nm.

10. The hot melt pressure sensitive adhesive according to claim 9, wherein the adhesive further comprises at least one plasticizer.

\* \* \* \* \*

UNITED STATES PATENT AND TRADEMARK OFFICE
CERTIFICATE OF CORRECTION

PATENT NO. : 10,711,166 B2
APPLICATION NO. : 15/802853
DATED : July 14, 2020
INVENTOR(S) : Palasz It is certified that error appears in the above-identified patent and that said Letters Patent is hereby corrected as shown below:

In the Specification

Column 3, Line 24: Change "2-ethyihexyl" to --2-ethylhexyl--.

Column 4, Line 50: Change "$B(C_6F_6)_4^-$" to --$B(C_6F_5)_4^-$--.

Column 5, Line 30: Change "tand" to --and the--.

Column 7, Line 32: Change "they" to --the--.

Signed and Sealed this
Twentieth Day of October, 2020

Andrei Iancu
*Director of the United States Patent and Trademark Office*